United States Patent
Cai (10) Patent No.: US 6,740,345 B2
(45) Date of Patent: May 25, 2004

(54) BEVERAGE MAKING CARTRIDGE

(76) Inventor: Edward Zhihua Cai, 4767 NW. Jeanice Pl., Corvallis, OR (US) 97330

( * ) Notice: Subject to any disclaimer, the term of this patent is extended or adjusted under 35 U.S.C. 154(b) by 143 days.

(21) Appl. No.: 09/748,495

(22) Filed: Dec. 22, 2000

(65) Prior Publication Data

US 2002/0078831 A1 Jun. 27, 2002

(51) Int. Cl.$^7$ .............................................. B65D 85/816
(52) U.S. Cl. .............................. 426/77; 426/78; 426/79; 426/112; 99/295
(58) Field of Search .............................. 426/77, 78, 79, 426/112, 433, 435; 99/295, 302 R, 307, 323

(56) References Cited

U.S. PATENT DOCUMENTS

| | | | |
|---|---|---|---|
| 299,198 A | * | 5/1884 | Bradford et al. |
| 959,110 A | * | 5/1910 | Buck |
| 1,335,048 A | * | 3/1920 | Diefendorf |
| 2,783,704 A | * | 3/1957 | Liebelt |
| 2,905,075 A | * | 9/1959 | Liebelt |
| 2,968,560 A | * | 1/1961 | Goros |
| 3,086,447 A | * | 4/1963 | Arnett et al. |
| 3,139,343 A | * | 6/1964 | Baselt |
| 3,292,527 A | * | 12/1966 | Stasse |
| 3,347,151 A | * | 10/1967 | Ronalds |
| 3,372,634 A | * | 3/1968 | Brinkman et al. |
| 3,405,630 A | * | 10/1968 | Weber |
| 3,518,933 A | * | 7/1970 | Weber |
| 3,628,444 A | * | 12/1971 | Mazza |
| 3,844,206 A | * | 10/1974 | Weber |
| 3,952,641 A | | 4/1976 | Vitous |
| 3,975,996 A | | 8/1976 | Vitous |
| 4,077,876 A | * | 3/1978 | Southall |
| 4,389,925 A | | 6/1983 | Piana |
| 4,452,130 A | * | 6/1984 | Klein |
| 4,471,689 A | | 9/1984 | Piana |
| 4,581,239 A | * | 4/1986 | Woolman et al. |
| 4,694,738 A | * | 9/1987 | Tarozzi |
| 4,759,474 A | | 7/1988 | Regunathan |
| 4,867,993 A | | 9/1989 | Nordskog |
| 4,882,982 A | | 11/1989 | Muttoni |

(List continued on next page.)

FOREIGN PATENT DOCUMENTS

| | | | |
|---|---|---|---|
| EP | 380947 | * | 8/1990 |
| EP | 0756844 | | 7/1996 |
| FR | 2228374 | * | 11/1974 |
| FR | 2579090 | * | 9/1986 |
| FR | 2653649 | * | 5/1991 |

*Primary Examiner*—Steven L. Weinstein (57) ABSTRACT

A cartridge for use with a mounting head for the preparation of fluid comestibles comprising a cartridge inlet, a chamber connected to said cartridge inlet for containing suitable flavor-containing or particle materials, a cartridge outlet connected to said chamber and a handle enabling a user to hold the handle to attach and secure the cartridge inlet to the mounting head to allow the liquid to be delivered under pressure through the flavor-containing or particle materials in the chamber, through the cartridge outlet and directly into a receptacle such as a cup or carafe for consumption, thereby dramatically simplifying the preparation of the fluid comestibles and relieving the user from the tedious cleaning work. The handle comprising at least part of the wall of the chamber, which is sufficiently rigid. The cartridge inlet has a cross-section area significantly smaller than that for the chamber to reduce the force exerted by the liquid pressure to the cartridge inlet, thereby lowering the risk of breaking the seal between the cartridge inlet and mounting head. The cartridge outlet may have a restrictive opening such as an orifice for forming a high-speed fluid jet or stream and an arrangement to allow it to interact with air to generate a foamy head for the fluid comestible. A freshness promoter can be used to prolong the freshness of the flavor-containing materials.

23 Claims, 5 Drawing Sheets

U.S. PATENT DOCUMENTS

| | | | |
|---|---|---|---|
| 4,886,674 A | * | 12/1989 | Seward et al. |
| 4,995,978 A | | 2/1991 | Van de Gang |
| 4,997,015 A | * | 3/1991 | Johnson |
| 5,108,768 A | | 4/1992 | So |
| 5,127,318 A | | 7/1992 | Selby |
| 5,150,645 A | | 9/1992 | Schiettecatte |
| 5,197,374 A | | 3/1993 | Fond |
| 5,207,149 A | | 5/1993 | Weber |
| 5,240,722 A | * | 8/1993 | Louridas |
| 5,242,702 A | | 9/1993 | Fond |
| 5,325,765 A | | 7/1994 | Sylvan |
| 5,330,266 A | * | 7/1994 | Stubaus |
| 5,390,587 A | * | 2/1995 | Wu |
| 5,398,595 A | | 3/1995 | Fond |
| 5,402,707 A | | 4/1995 | Fond et al. |
| 5,472,719 A | | 12/1995 | Favre |
| 5,473,973 A | | 12/1995 | Cortese |
| 5,567,461 A | * | 10/1996 | Lehrer |
| 5,637,335 A | | 6/1997 | Fond et al. |
| 5,638,740 A | * | 6/1997 | Cai |
| 5,656,316 A | | 8/1997 | Fond |
| 5,695,168 A | * | 12/1997 | Williams |
| 5,738,002 A | * | 4/1998 | Marano-Ducarne |
| 5,840,189 A | | 11/1998 | Sylvan |
| 5,897,899 A | | 4/1999 | Fond |
| 5,948,455 A | | 9/1999 | Schaeffer et al. |
| 6,079,315 A | | 6/2000 | Beaulieu |
| 6,158,328 A | | 12/2000 | Cai |
| 6,182,554 B1 | | 2/2001 | Beaulieu |
| 6,186,051 B1 | * | 2/2001 | Aarts |
| 6,202,541 B1 | | 3/2001 | Cai |
| 6,347,725 B1 | | 2/2002 | Yoakim et al. |

* cited by examiner

BEVERAGE MAKING CARTRIDGE

FIELD OF THE INVENTION

The present invention relates to a cartridge and method for making drinks and other fluid comestibles. Particularly, the present invention relates to a cartridge and method that allows a user to make better-tasting beverages in faster, safer and a cleaner manner.

BACKGROUND OF THE INVENTION

It has been known for centuries to interact flavor-containing or absorbent materials with water to prepare coffee, tea, espresso, milk, cocoa, herb, filtered water, soup and other fluid comestibles. The steeping of roasted coffee grounds under ambient pressure emerged in late $14^{th}$ century and has been automated with the inventions of stove-top percolator in 1820's, electric percolator in 1950's, and automatic drip coffee maker in the 1970s. The steeping of roasted coffee under elevated pressure, resulting in the well-known espresso drinks, emerged with the invention of steam espresso machine in 1910's and later improved by the inventions of piston espresso machine in 1940's and pump espresso machine in 1960's.

Currently, coffee and espresso drinks are mostly made by measuring and filling loose coffee grounds into a filter basket, mounting the basket to the brew head of an espresso machine or coffeemaker, delivering hot water through the grounds either under ambient or high pressure, and receiving the extraction in a cup or a carafe. After enjoying the coffee or espresso, the user must face the tedious tasks of removing the dripping basket, discarding the wet grounds, cleaning the filter basket, the machine, countertop and the carafe, and replacing the filter basket and carafe back into the machine. The above process, although simple, involves too many steps and is too time-consuming for some users, especially when espresso drinks are concerned. In addition, it is messy since most users will splutter the loose coffee grounds when filling the filter basket and drip brown coffee around the kitchen when discarding the wet, used grounds. Furthermore, the quality of the brew, especially espresso, is inconsistent due to many difficult-to-repeat process variables such as ground size, the degree of tamping of the grounds and the amount of grounds.

To make latte, cappuccino, mocha and other milk-containing coffee drinks, the user must heat or froth milk with steam from a steam source such as a steam or pump espresso machine. The heated or frothed milk is then mixed with espresso by pouring milk into espresso or vice versa. To heat or froth milk the user inserts a steam nozzle into the milk in a cup or pitcher, bobs the cup up and down to generate foam, and watches the milk carefully to avoid overheating or overflow. Such milk frothing is intimating to most consumers, which contributes in preventing most people from enjoying latte, cappuccino and mocha at their homes.

To simplify the process of making coffee and espresso, it has been proposed to seal ground coffee in individual air-impermeable packages. For example, coffee pouches, comprising a dose of ground coffee for one or more cups of coffee loosely packed in a paper filter bag and sealed in an air-impermeable film pouch, are available in most hotel rooms having a coffeemaker. To make coffee, the user tears open the film package and place the paper filter bag in the filter basket of the coffeemaker. Such coffee pouch, although relieving the users from measuring and handling loose coffee grounds, requires them to perform much tedious work such as cleaning the filter basket, machine, countertop and carafe, mounting the basket to the machine, and replacing the filter basket and carafe after cleaning back into the coffeemaker.

Such coffee pouch concept has also been applied to espresso. In "espresso pods" such as those offered by STARBUCKS Coffee company and illy espresso of the America, the dose of coffee grounds is compactly packed in the paper filter bag and then sealed in an air-impermeable film pouch. To make espresso, the user opens the sealed pouch, places the pod into the holder and places the holder firmly into the brew head before starting the brewing. Such espresso pod removes the variability of tamping the coffee grounds and relieves the user from measuring and handling loose grounds. Like coffee pouch, the espresso pod, however, requires the users to perform much tedious work such as cleaning the holder, machine and countertop, mounting the holder to the machine, and replacing the holder after cleaning back into the machine.

Fond, Lavanchy and Yoakim in U.S. Pat. No. 5,656,316 and Favre in U.S. Pat. No. 5,472,719 taught a sealed coffee cartridge that is to be placed into a brewing chamber of a holder. The holder is then mounted in an espresso machine. To make coffee or espresso, the cartridge is pierced by a needle for injection of water into the cartridge and by perforator tips or relief surface elements for the flow of the fluid comestibles from the cartridge. Compared to espresso pods, such sealed cartridges do not need the air-impermeable film pouch to prevent the loss of aroma and retain the freshness of the coffee grounds for prolonged period of time, thus saving the user the step of opening the film pouch. However, like the espresso pods the sealed cartridges also require the much tedious work such as cleaning the holder, machine and countertop, mounting the holder to the machine, and replacing the holder after cleaning back into the machine. In addition, there exists some risk that the user's fingers get injured by the needle and perforator tips used to pierce the sealed cartridges.

Accordingly, the present invention intends to provide a cartridge and method to relieve the users from the tedious work of cleaning the holder or filter basket, machine and countertop. The present invention also intends to provide a cartridge and method to drastically simplify the process of making drinks and other liquids and reduce the time needed. The present invention further intends to provide a package and method for improving the freshness of the coffee grounds the taste of the drinks.

SUMMARY OF THE INVENTION

In accordance with the present invention, there is provided a new cartridge and method for making fluid comestibles such as cappuccino, latte, mocha, espresso, coffee, tea, hot chocolate, soup or frothed milk. The cartridge comprises a cartridge inlet for connecting to a mounting head and introducing water under pressure into the cartridge, a chamber connected to said cartridge inlet for containing suitable flavor-containing or particle materials and for allowing the interaction of the materials with water under pressure therein to form the fluid comestibles, a cartridge outlet connected to the chamber for discharging the fluid comestibles, and a handle enabling a user to hold the handle to attach and secure the cartridge inlet to the mounting head. The cartridge may contain one or more types of flavor-containing or particle materials in the chamber to make the desired beverage. In one embodiment, the chamber contains only roasted ground coffee supported on a filter sealed to the bottom of the chamber for making coffee or espresso. In another embodiment, chamber comprises granular or powdered milk supported on a first filter (or a separator) sealed to the bottom of the chamber and roasted ground coffee separated from the granular or powdered milk by a second filter. The first filter (or a separator) has larger openings than the second filter to prevent the gel or gel-like protein materials in the granular or powdered milk from clogging the first filter (or a separator). A freshness promoter is provided to prolong the freshness of the flavor-containing materials in the chamber.

The cartridge inlet, chamber, cartridge outlet may be formed as one single and integral part and adapt a generally spherical or cylindrical shape to increase the cartridge's resistance to liquid pressure and lower manufacturing cost. In one embodiment, the handle comprises the wall of the chamber, which is sufficiently rigid to prevent deformation or damage. In another embodiment, the handle comprises only part of the wall of the chamber or may be even a separate part attached to or formed on the cartridge body.

The cartridge outlet comprises an opening for issuing the beverage and an arrangement to allow the beverage from the opening to enter a receptacle such as cup or carafe directly without contacting any other parts, thus relieving the user from the tedious work of cleaning the machines used to make beverage as required by all existing cartridge. The opening can be a restrictive opening such as a nozzle or orifice to produce a high-speed fluid jet or stream. In one embodiment, the arrangement allows the high-speed fluid stream or jet from the restrictive opening to collide or interact with a solid surface such as the inner wall of the cartridge outlet, thereby producing foamy head or crema for the fluid comestible. In another embodiment, the arrangement allows the high-speed fluid stream or jet to inject directly into the receptacle such as a cup or carafe. In the process, the high-speed fluid stream or jet carries the surrounding air into the fluid comestibles in the receptacle such as a cup or carafe thereby generating foamy head or crema for the fluid comestibles. In another embodiment, the cartridge outlet further comprises a outlet chamber below the restrictive opening for receiving the high-speed fluid stream or jet and causing the mixing of air with fluid, thereby producing fine air bubbles. In another embodiment, the cartridge outlet further comprises at least one additional restrictive opening. These restrictive openings being so constructed that the resulting high-speed fluid streams or jets will meet or collide in the space inside or outside the cartridge outlet, thereby generating foamy head or crema for the fluid comestibles. The restrictive opening can be normally very small or closed and but can increase in size when the pressure above increases.

To lower the risk of breaking the seal between the cartridge inlet and the mounting head, which may cause personal injury, and to reduce the structural strength on the cartridge inlet, the cartridge inlet is constructed to have a cross-section area significantly smaller than the chamber. The cross-section area of the cartridge inlet can be approximately $1/200$ to approximately $1/2$, preferably $1/100$ to $1/4$ that for the chamber. A valve can be located in the cartridge inlet to prevent the flavor-containing materials and the pressurized liquid from gushing out of the cartridge inlet in case that a user removes the cartridge from the mounting head when the cartridge is still under pressure. The cartridge inlet may also comprise a safety element to prevent the user from removing the cartridge when the cartridge is still under pressure. A valve may also be located in the cartridge inlet or the cartridge outlet to prevent the dripping of the wet flavor-containing materials or chamber before or during the removal of the used cartridge.

The mounting head for the cartridge inlet comprises a cylindrical chamber, a flow channel connected to a pressurized water source, an extension tube having a smaller diameter near its end and being connected to the flow channel, and two parallel spiral- or helix-shaped ledges or ridges as the lock element to form a bayonet joint with the flange. The cylindrical chamber is dimensioned to receive cylindrical body of the cartridge inlet and to allow the flange of the cartridge inlet to move upwards along the spiral-shaped ledges as one rotates the cartridge. The extension tube is extended a large distance beyond the bottom of the cylindrical chamber of the mounting head to act as a guide for the user to insert the extension tube into the cylindrical opening of the cartridge inlet and to mount the cartridge to the mounting head.

To make the beverage, one simply holds the handle of the cartridge to secure the cartridge inlet to the mounting head, and then causes the liquid to be delivered under pressure through the flavor-containing or particle materials in the chamber and through the cartridge outlet directly into a receptacle such as a cup or carafe for consumption. This is a simple two-step process to make beverages like espresso, latte, cappuccino and mocha, compared to the complex process employed today. In addition, there are no machine, no baskets and no holders to clean after preparing the fluid comestibles, thus relieving the user from the traditional tedious cleaning work after making coffee or espresso.

In another embodiment of the invention, the cartridge comprises a flavor-containing or particle materials, a filter for the flavor-containing or particle materials, a lower body comprising an lower chamber having a generally closed end and a generally open end, a first flange formed at said generally open end, and a cartridge outlet formed at the generally closed end for discharging the beverage, and an upper body comprising an upper chamber having a generally closed end and a generally open end, a second flange formed at said generally open end, and a cartridge inlet formed at the generally closed end. The cartridge inlet have a sealing surface for forming a hermetic seal with a mounting head and a liquid opening located near the center part of the sealing surface for introducing the pressurized liquid from the mounting head into the upper chamber. The upper and lower bodies being sealed together at said first and second flanges to form a chamber to contain the flavor-containing or particle materials. The liquid opening has a sufficiently small size to lower the force exerted by the pressurized liquid to the hermetic seal thereby improving the hermetic seal, whereby, in use, the sealing surface of the cartridge inlet is brought against the mounting head to form the hermetic seal around the liquid opening thereby allowing the pressurized liquid to be introduced into the chamber wherein it interacts with the flavor-containing or particle materials to form the beverage.

It is an object of the present invention to provide a cartridge and method for making better tasting beverages such as better tasting coffee, espresso, milk, soup, hot chocolate, cappuccino, latte, mocha or tea.

It is a further object of the present invention to provide a cartridge and method to dramatically simplify the process of making beverages.

It is a further object of the present invention to provide a cartridge and method to relieve the users from the tedious cleaning work after preparing beverages.

It is a further object of the present invention to provide a cartridge, cartridge connector (or mounting head), and method to reduce the safety risk to the user associated with hot or pressurized liquid.

It is a further object of the present invention to provide a cartridge that can be manufactured at very low cost.

It is a further object of the present invention to provide a cartridge that can produce a beverage with a visually appealing layer of crema or foamy head.

It is a further object of the present invention to provide a package and method to preserve the freshness and aroma of the flavor-containing materials like roasted coffee beans or grounds.

It is a further object of the present invention to provide a cartridge and method to make beverage fast thus reducing the waiting time for customers or users.

These and other objectives and advantages of the present invention will become apparent from the following description of the preferred embodiments, taken together with the accompanying drawings.

DESCRIPTION OF THE DRAWING

The accompanying drawing illustrates diagrammatically non-limitative embodiment of the invention, as follows.

DETAILED DESCRIPTION OF THE PREFERRED EMBODIMENTS

Figure 1:
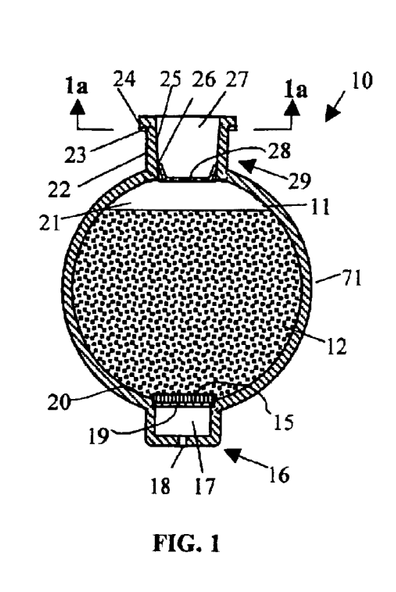
FIG. 1 is a sectional view of a cartridge containing flavor-containing materials to be extracted.
Figure 1A:
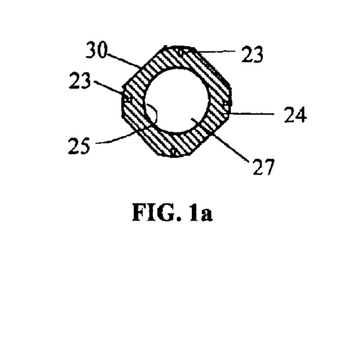
FIG. 1a is a sectional view along line 1a—1a of FIG. 1.
Figure 2:
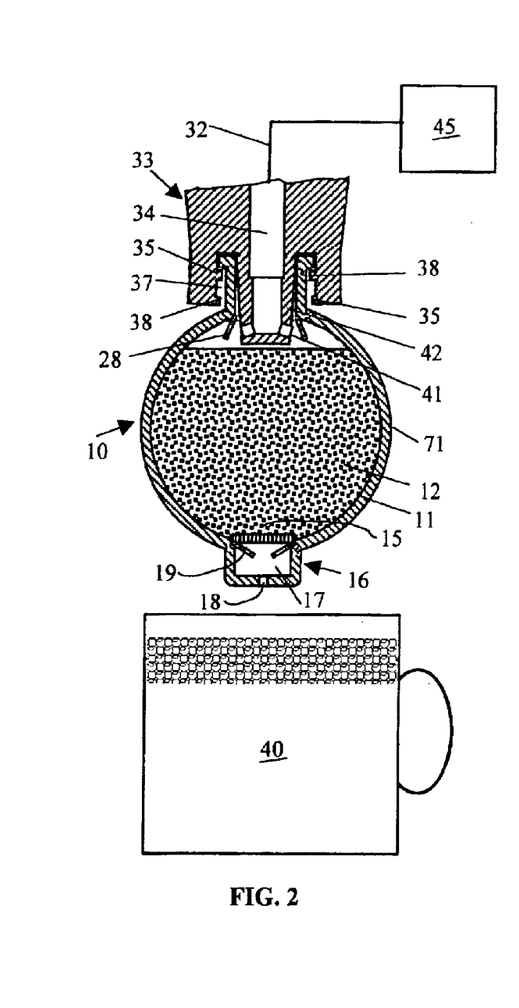
FIG. 2 is a sectional view of the cartridge of FIG. 1 and a cartridge connector in a connected position to allow the extraction of the flavor-containing materials by pressurized water.

FIG. 1 shows a cartridge 10 and FIG. 2 shows the cartridge in use for making beverage having a foamy head or crema. Cartridge 10 comprises a cartridge inlet 29 having a generally cylindrical body 22, a cylindrical opening 27 with a sloped internal surface 25 and a generally circular flange 24 having four cuts 30 (FIG. 1a) as the lock element for connecting to a mounting head 33. The mounting head 33 can be hand-held or fixed in position. It comprises a cylindrical chamber 37, a flow channel 34 connected to a pressurized water source 45 through conduit 32, an extension tube 42 having a smaller diameter near its end and being connected to channel 34, and two parallel spiral- or helix-shaped ledges or ridges 35 and 38 as the lock element to form a bayonet joint with flange 24. The cylindrical chamber 37 is dimensioned to receive cylindrical body 22 and to allow the flange 24 to move upwards along the spiral-shaped ledges as one rotates the cartridge. The extension tube 42 of the mounting head 33 is extended a certain distance beyond the bottom of the chamber 37 to act as a guide for the user to insert the extension tube into the cylindrical opening 27 and to mount the cartridge to the mounting head. The cylindrical opening 27 of the cartridge inlet is dimensioned to form a water-tight seal with the extension tube.

To minimize the hydraulic force acted on the cartridge inlet by the pressure in the cartridge thus reducing the potential pressure hazard to the user and the strength requirement for the cartridge inlet, the cross-section area of the cylindrical opening 27 is adapted to be significantly smaller than that for the chamber. The hydraulic force is believed to equal to the product of the cross-section area of the cylindrical opening and the pressure in the cartridge. To just appreciate the magnitude of such hydraulic force, the force exerted to a filter holder by the water pressure generated in an espresso machine can be as high as 300 kilograms assuming that the filter holder has an diameter of 2.5 inches and the pressure generated by the espresso machine is 10 bars or 147 psi. The cross-section area of the cylindrical opening 27 can be approximately $1/200$ to approximately $1/2$, preferably $1/100$ to $1/4$ of the cross-section area of the chamber 11 at its largest part or near the center of the chamber.

The flange 24 can adapt other shapes or forms such a non-circular flange or a circular flange with two cuts. The spiral- or helix-shaped ledges or ridges can have more or less than one turn such as one turn, one half turn, a quarter turn or one sixth turn, and can be replaced by other elongated protrusions trending upwards along the wall of the cylindrical chamber 37. To improve the seal between the cylindrical opening 27 and the extension tube 42, a gasket or O-ring may be mounted on the outer wall of the extension tube or the top of the cylindrical chamber 37. A plurality of tilted holes 41 are formed on the extension tube for spraying or distributing water uniformly. The tilted holes 41 is tilted downwardly to reduce the risk of harming the user by hot water stream if the cartridge is removed when the potentially very hot or pressurized water is not turned off yet.

A barrier film 28 is attached to the lower part of the cylindrical opening 27 for preventing or impeding the transport of gaseous compounds such as oxygen, water, flavor or aroma through the cartridge inlet. The internal surface 25 of cylindrical opening 27 is slightly sloped to facilitate the attaching process (e.g. heat sealing or adhesive bonding) of the barrier film to the internal surface. The barrier film is breakable either by the insertion of the extension tube into the cylindrical opening 27 (refer to FIG. 2) or by the pressure of the pressurized water. The barrier film can be a single layer film (e.g. polyethylene, polypropylene, aluminum foil or polyester film), a metallized plastic film (e.g. aluminum or silver coated PET or PP), a co-extruded film (e.g. EVOH, Nylon, PVDC extruded with PE), a laminate (e.g. Al/PE, Al/PP or Al/PET), or adhesive film (e.g. aluminum foil/polyacrylic).

Figure 2A:
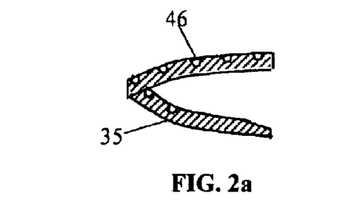
FIG. 2a diagrammatically illustrates one of the support helixes of FIG. 2.

A plurality of protrusions 23 (FIGS. 1 and 1a), preferably of half or partial cylindrical shape, are formed at the underside of the flange 24 to prevent the user to remove the cartridge from the mounting head 33 when the pressure in the cartridge is still high. The protrusions 23 are receivable in the recessed sections 46 (FIG. 2a) on the spiral-shaped ledges or ridges, therefore making it hard for the user to rotate the cartridge when the pressure is high in the cartridge. The helix or spiral-shaped ledges or ridges may be flatter (FIG. 2a) near the top end to make it harder for the cartridge to rotate when the flange 24 is on the top part of the spiral-shaped ledges or ridges. The cylindrical chamber 37 may having a gradually decreasing diameter from bottom to top to allow a close fit between the interior wall of the cylindrical chamber 37 and the flange 24 when the cartridge is mounted (FIG. 2), thereby making it harder to move the cartridge and increasing the safety to the user. It is appreciated that certain pins, latches and other mechanical fixtures that can be activated by the pressure in the mounting head or cartridge to lock the cartridge may be used alone or in combination to reduce the pressure hazard and insure the safety to the user.

The cartridge 10 further comprises a generally spherical chamber 11, a supply of flavor-containing materials or particle materials 12, a filter 15 for the materials 12, a barrier film 19 for preserving the flavor or aroma or freshness of the materials 12 and a cartridge outlet 16 for the beverage or fluid, and a handle 71 for enabling a user to hold the handle to attach and secure the cartridge inlet 29 to the mounting head 33. The handle comprises at least part of the wall of the chamber, which is sufficiently rigid and adapted for the user to hold without causing substantial deformation or damage. The chamber adopts a spherical shape to increase the pressure the cartridge can withstand during the extraction or interaction of the materials 12 with the aqueous media. The spherical chamber 11 is rigid to function as a handle to allow the user to hold the chamber, place the cylindrical opening 27 of the cartridge around the extension tube 42, push the cartridge upwards, and rotate the cartridge (which causes the flange 24 to move along the helix-shaped ledges upwards) until the cartridge inlet is firmly mounted into the cylindrical chamber 37 of the mounting head. To remove the cartridge, the user holds the spherical chamber 11 (as a handle) to rotate it in the opposite direction. The chamber may comprise a plurality of features such as ridges, ledges, ribs, grooves or spherical dots on its outer surface to make it for the user to hold the chamber 11 and to make the surface feel cool after hot water is forced through the cartridge. Low heating conducting materials such as plastics (e.g. polypropylene, polyester and Nylon) may be used for the chamber reduce the heat conduction to the outer surface of the chamber.

The cartridge outlet 16 comprises a collection chamber or collector 17 for collecting the fluid produced from the flavor-containing materials or particle materials and an opening 18 for discharging the collected beverage or fluid. The beverage is discharged directly into a receptacle 40 such as a carafe or cup for consumption or use, rather than to the bottom of a filter holder that is required the existing or currently known beverage cartridges. Obviously, by avoiding the need for a filter holder, the cartridge 10 is dramatically easier to use than any existing or known beverage cartridges, and will save great amount of time in making beverages such as coffee and espresso drinks for the users at homes and in commercial places like restaurants, fast food, cafes and coffee outlets. Furthermore, since the beverage from cartridge outlet 16 does not contact any part of the beverage making equipment and the cartridge itself can disposed or recycled, the consumers or users do not the need to clean anything after preparing the beverage. This makes process of making coffee, espresso, cappuccino, mocha, latte and other beverages with cartridge 10 much friendlier and less labor intensive than with existing or known beverage cartridges.

The opening 18 can be a small orifice or other type of opening that is restrictive or small enough to produce a high-speed jet or stream of fluid. The high-speed jet or stream, surprisingly, produces a layer of fine foamy head or crema on top of the beverage when received directly in the cup 40. In addition, the quality and taste of the coffee, espresso, cappuccino, latte, mocha and other beverages is improved when such an orifice or restrictive opening is used in the cartridge. The filter 15 is attached at its peripheral to the bottom 20 at the entrance of the collector 17. The filter serves the purpose of protecting the orifice or restrictive opening 18 from being clogged by the flavor-containing materials or particle materials and/or the purpose of preventing the materials from being discharged into the cup. The barrier film 19 is also attached at its peripheral to the bottom 20 of the cartridge below the filter 15 and is breakable by the beverage or fluid from the filter. The filter can be water-permeable materials with sufficient strength when wetted in water, and preferably heat sealable. Examples of suitable materials comprise synthetic cloth, stainless steel or copper mesh filter, non-woven polypropylene sold under trade name Typar or Corovin, spun-bonded polyester sold under trade name Remay, spun-bonded nylon sold under trade name Cerex, and perforated metal or polymer films.

The cartridge outlet 16 of cartridge 10 can be dimensioned to fit into the substantially cylindrical opening 27 of the cartridge inlet 28, or vice versa, of another identical cartridge. This allows one cartridge to be connected to another by inserting one cartridge's inlet into another cartridge's outlet (or vice versa), therefore making the packaging and storage of the cartridges easier for the manufacturers, retailers and end users more convenient. For example, six, ten or twelve cartridges may be connected in such "inlet into outlet" or "outlet into inlet" manner to form an integrated row for storage on retail shelves or kitchen cabinets.

To reduce the chance of leakage when the cartridge 10 is exposed to high fluid pressure, it is preferred that the cartridge inlet 29, chamber 11 and cartridge outlet 16 are of an integrated body without any seam. Such a cartridge of an integrated body can be made by blow-molding process. The barrier film 28 may be attached to the cartridge inlet 29 to close the inlet by heat sealing or adhesive bonding. The filter 15 and barrier film 19 can be attached to the bottom of the chamber by heat sealing, adhesive bonding or mechanical sealing. The cartridge inlet, chamber and filter can be made of the same material such as polyester, polypropylene or nylon to facilitate recyclability or reuse of the material, and can be made of degradable materials such as biodegradable poly(lactic acid), thereby reducing the burden to environment.

The flavor-containing materials or particle materials can be coffee grounds, tea, granular milk, cocoa, chocolate, water filtration materials (for making filtered or pure water), soluble food powder (for making soup) sugar, artificial sweetener, powdered creamer, herb or any combination of these materials. The flavor-containing materials or particle materials is filled into the chamber 11 via the cartridge inlet after the filter 15 and the barrier film 15 are attached to the bottom of the chamber 11 above the collector 17. The amount of materials in the cartridge depends on the volume of fluids to be made from the cartridge. For example, about 3 to ten grams, preferably about 4.5 to 7 grams of coffee grounds may be included in a cartridge to make a single cup of coffee or espresso. About 20 to 50 grams, preferably 25 to 30 grams, of coffee grounds may be included in a cartridge to make five cups of coffee.

When two or more types of materials are included in one cartridge, the materials can be either mixed or separated. For examples, water filtration materials may be positioned above coffee grounds, preferably with a separator in between, to ensure that filtered or pure water is used to extract the coffee grounds to make coffee or espresso. For a cartridge to make late or cappuccino, a supply of coffee grounds is positioned above a supply of granular milk in the cartridge and separated from the milk by a coffee filter. The coffee extraction from the coffee grounds flows downstream to dissolve the granular milk and form cappuccino or latte. The granular milk is maintained in the cartridge by another filter with coarser openings to avoid complete clogging of the filter by the gel or insoluble proteins originally in the milk or as a result of the interaction between the coffee and milk. For a cartridge to make sweet coffee, sugar or artificial sweetener can be mixed with coffee grounds. More specific examples of such cartridges with two or more types of materials will be given later.

The pressurized aqueous media can be the pressurized water from an in-house or in-building plumb system and is heated by an in-line heater. The mounting head 33 can be in a hand-held device connected to the in-line heater by a flexible tube or can be in a counter-top device connected to the in-line heater. The hot water from the in-line heater is delivered to the mounting head and through the cartridge 10 by the pressure in the -house or in-building plumb system. The aqueous media pressurized aqueous media can be produced by a pressurization means such as a pump, pressurized steam or pressurized air in a device or apparatus and can be heated by a heater in the device or apparatus. The mounting head is connected to the pressurization means.

To make beverage or other fluid comestibles with the cartridge 10 of FIG. 1, the user simply holds the handle 71 (i.e. the wall of the chamber 11) to align the opening 27 of the cartridge inlet 29 with the extension tube 42 and to push the cartridge inlet upwards and rotate the cartridge inlet within the cylindrical chamber 37 until it becomes tight. The user then causes the pressurized water to be delivered from the source 45 through the conduit 32, channel 34, the flavor-containing or particle materials 12 in the chamber 11 and the cartridge outlet, from which the fluid comestibles is discharged directly into receptacle 40 such as a cup or carafe for consumption. The user then removes the used cartridge 10 to dispose or recycle it. Unlike the other cartridges known in the art, the cartridge 10 requires no holder or brewing chamber and there is no parts to be cleaned after the preparation of the beverage. As a result, cartridge 10 will dramatically simplify the preparation of the fluid comestibles and relieve the user from the tedious cleaning work.

Figure 3:
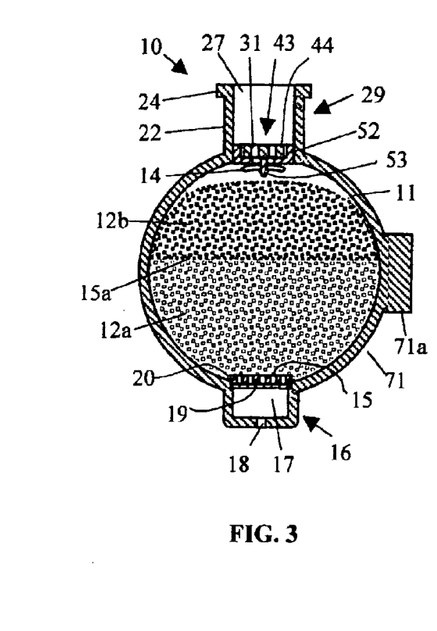
FIGS. 3–3d show several modified versions of the cartridge of FIG. 1.

FIG. 3 shows a modified cartridge 10 that contains a first flavor-containing materials or particle materials 12a above filter 15 and a second flavor-containing materials or particle materials 12b enclosed by filter 15a to form a pouch. For a cartridge to make espresso drinks such latte, cappuccino or mocha, the materials 12b is roasted ground coffee and the materials 12a is milk powder or granules, chocolate or other materials. It was noted that the gel or gel-like matters in milk or chocolate frequently clogs filter 15a if the filter is too fine.

Therefore, for milk powder or granules, chocolate or other materials containing insoluble gel or gel-like matters, the filter 15 below should be relatively coarse filter, with an approximate average pore size of about 0.01 mm to 2 mm, preferably of 0.1 mm to 1 mm. The materials 12b can also be activated carbon for filtering the water before it reaches the materials 12a.

A handle extension 71a is formed on the handle 71, i.e. the sufficiently rigid wall of chamber 11 for making it easier for a user to hold the cartridge. A valve 43 is fitted to the opening 27 of the cartridge inlet for preventing the flavor-containing materials or particle materials and liquid in the chamber 11 from streaming out of the cartridge inlet if the user removes the cartridge that is still pressurized. The valve comprises a body 52 having an opening, a elastomer member such as a disc 14 for closing the opening of the body 52, and a keeper 44 having openings 31 and a stem 53 with a enlarged end to keep the elastomer member 14 attached to the stem. The elastomer member 14 can be loaded to seal the opening of the valve body 52, therefore impeding flavor or aroma loss during the storage of the cartridge and preventing liquid from dripping out of the used cartridge during disposal. It is appreciated that to just reduce the amount of streaming-out of materials 12 and liquid in the chamber the valve 43 can be a simple restrictive opening. It also is appreciated that to stop the dripping of the residual fluid in the cartridge the valve 43 can be located in or above the cartridge outlet 16.

Figure 3A:
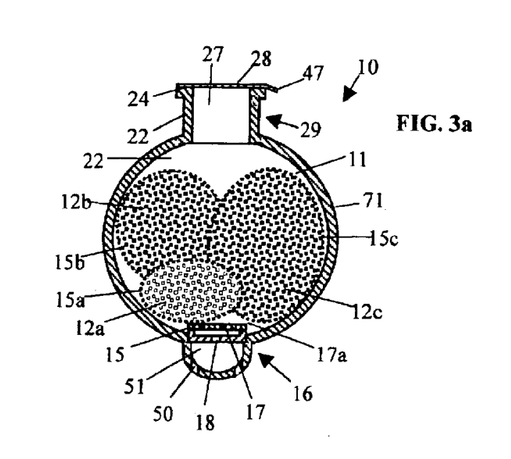

FIG. 3a shows another modified cartridge 10 that contains flavor-containing materials 12a, 12b and 12c enclosed by filters 15a, 15b and 15c, respectively for form three pouches. The pouches are inserted into the chamber 11 through the cartridge inlet 29. The materials 12a, 12b and 12c can be the same or different materials. Filter or separator 15 is attached to the collector 17 to prevent the pouches or particles from entering the collector and clogging the orifice or restrictive opening 18. An outlet chamber 51 is located below orifice 18 for receiving the high-speed fluid jet or stream from the orifice and causing the mixing of air with fluid in the outlet chamber. One or more openings are formed at the bottom of the outlet chamber for discharging fluid and fine air bubbles into a receptacle such as a cup or carafe 40.

Figure 3B:
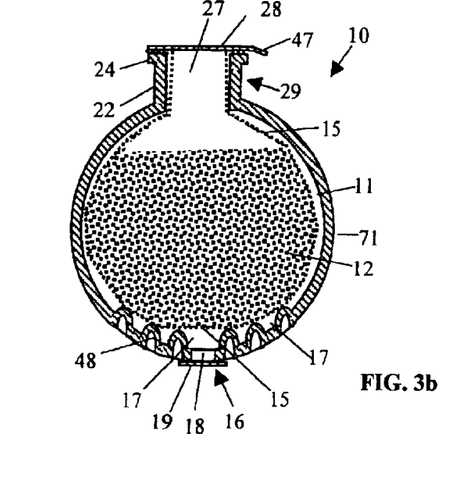

FIG. 3b shows another modified cartridge 10 where the peripheral of the filter 15 is sealed to the cartridge inlet 29 to form a filter bag for containing the flavor-containing materials or particle materials 12. A plurality of protrusions such as spherical dots, ridges or channels are formed at the bottom of the chamber 11 to form collector 17, which leads the beverage or fluids from filter 15 to the cartridge outlet 16. The barrier film 28 has a handle area for the user to pull and remove the film prior to mounting it to the mounting head 33. The barrier film 18 can be made removable by the user prior to mounting the cartridge to the mounting head or made breakable by the beverage or fluid from the filter 15.

Figure 3C:
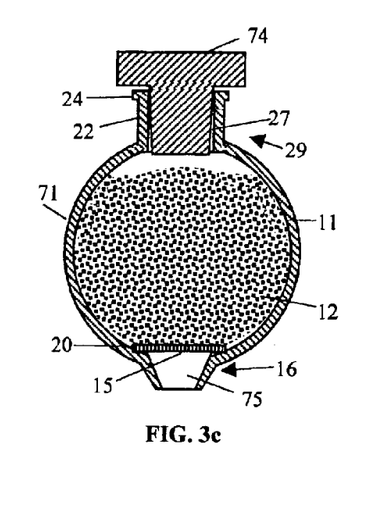

FIG. 3c shows another modified cartridge 10 where the opening 27 of cartridge inlet 29 is sealed by a cap or plug 74 that is removable by the user. The flavor-containing materials or particle materials 12 is directly on the filter 15. In use, the beverage form the filter is discharged through outlet 75 directly to a receptacle such as a cup or carafe 40. This cartridge is refillable by the user. To refill, the user discards the used, wet materials 12, dry the empty cartridges if necessary, fill the chamber 11 with the desired new materials 12 and replace the cap or plug 74.

Figure 3D:
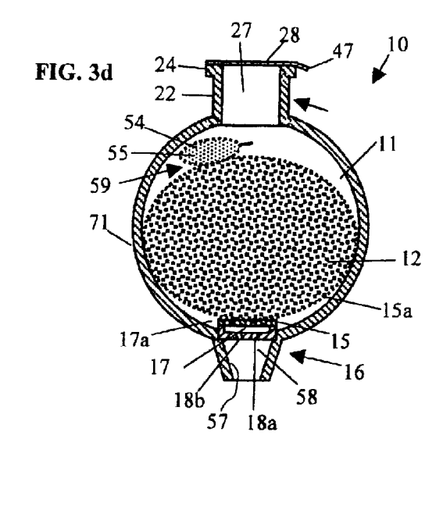
Figure 3E:
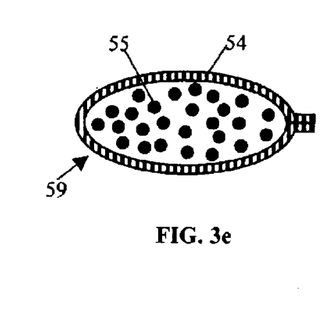
FIG. 3e is a sectional view of the freshness promoter for roasted coffee.

FIG. 3d shows another modified cartridge 10 comprising a freshness promoter 59 located in chamber 12 for prolonging the freshness of the roasted and ground coffee. The freshness promoter comprising a supply of reactive materials 55 that can react with water vapor in said sealed compartment, thereby impeding the deterioration of the coffee grounds or/and react with the carbon dioxide released by coffee grounds, thereby preventing over pressurization of the cartridge as a result of the released carbon dioxide and a separator 54 for enclosing the reactive materials or preventing the reactive materials from contacting or contaminating the coffee grounds. The reactive materials can be lime (e.g. calcium oxide) or other oxide of alkali metals and alkaline earth metals. The separator is permeable to carbon dioxide and water vapor to allow them to pass through readily and react with the reactive materials. It is preferably made from a hydrophobic porous film such as a porous polypropylene, PTFE, PVDF or polyethylene film, so that the liquid water from the cartridge inlet can not reach and leach out the reactive materials.

A freshness promoter can also be used to prolong the freshness of the roasted coffee beans in a package having a sealed compartment such as a sealed coffee bag or container (not shown). It is known that when freshly roasted coffee beans is sealed in a bag or container the pressure therein will increase due to the gradual release of carbon dioxide. Various check valves have been used to release the carbon dioxide without letting oxygen in. Such check valves, however, also releases the aroma. Water vapor is known to cause the deterioration of the roasted coffee beans, but such check valve can not remove water vapor. The freshness promoter 59 contains reactive materials 55 such as lime (e.g. calcium oxide) or other oxide of alkali metals and alkaline earth metals can absorb both water and carbon dioxide, therefore providing a simple solution for both well-known problems for the storage of freshly roasted coffee beans. A plurality of freshness promoter 59 may be placed in one package of freshly roasted coffee beans.

Unlike the cartridge of FIG. 3a, this modified cartridge of FIG. 3 comprises two or more orifices or restrictive openings 18a and 18b which are so constructed that the high-speed fluid streams or jets produced from the orifices meet or collide in the space 58. Such collision between two more high-speed jets causes the inclusion of fine air bubbles into the fluid. The fine air bubbles in the fluid become a foamy head or crema after the fluid comestible is received in receptacle 40 such as a cup or carafe. It is also found that a foamy head is produced in the receptacle 40 when the high-speed fluid jets or streams do not collide with each other in the space 58 but instead collide with the inner surface 57 of the cartridge outlet 16. It is also found that a cartridge with only one orifice 18a that is tilted to allow the steam jet to collide with the inner surface 57 can produce a beverage with a thick foamy head or crema in the receptacle 40.

Figures 4, 4A:
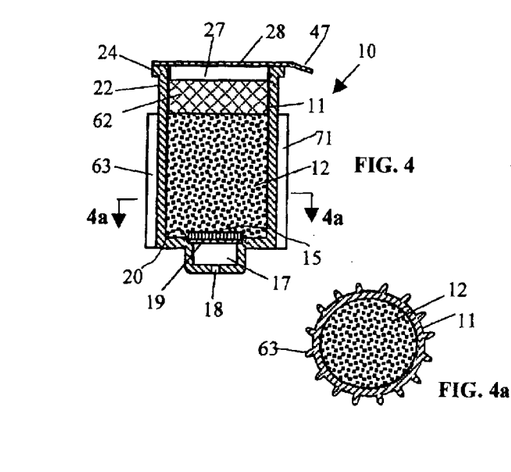
FIG. 4 a section view of an alternative beverage cartridge.
FIG. 4a is a sectional view along line 4a—4a of FIG. 4.

FIGS. 4 and 4a shows a modified cartridge 10 that has a cylindrical chamber 11 and a plurality of fins or ribs 63 on the outer wall of the chamber for facilitating the mounting and removal of the cartridge from the mounting head. The fins 63 also make the cartridge cooler to touch after hot water is passed through. A piece of porous materials such as bonded or unbonded fibers, foam or cloth 62 is placed above the flavor-containing materials or particle materials to restrict the movement of the materials in the chamber 11.

Figure 5:
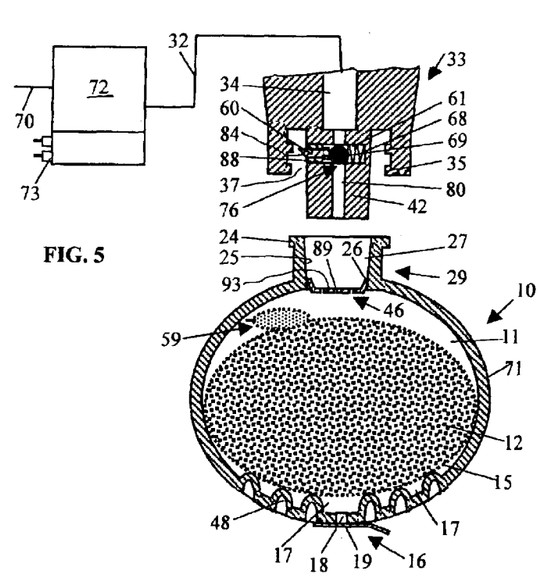
FIG. 5 is a sectional view of modified version of the cartridge of FIG. 1 and a cartridge connector.
Figure 5A:
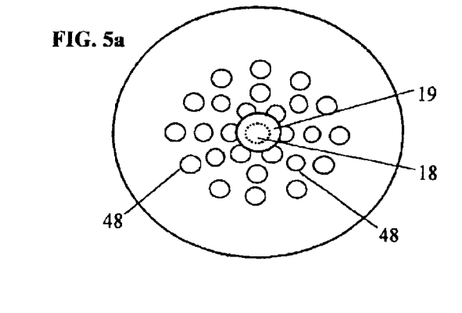
FIG. 5a is a bottom view of the cartridge of FIG. 5.

FIG. 5 shows a modified cartridge 10 and a modified mounting head 33 for making beverages. A valve 43 comprising an elastic film 93 and one or more expandable openings 89 is attached to the bottom part 26 of the inner wall 25 in cartridge inlet 29 for preventing the materials 12 and liquid in the chamber 11 from streaming out of the cartridge inlet if the user removes the cartridge when it is pressurized. In this sense the elastic film functions as a safety valve for the cartridge. The elastic film can be a thermoplastic elastomer film such as polyurethane, polyolefin or polyester elastomer film that can be heat-staked to the cartridge inlet or a rubber film. The opening 89 can be a cut that is normally closed or be small enough to have capillary force to prevent residual liquid from dripping out of the used cartridge during disposal. Such opening can also reduce flavor or aroma loss during the storage of the cartridge. The opening 89 is expanded when force is applied to the elastic film 93, either by the extension tube when the cartridge is mounted or by the pressurized liquid from the mounting head. It is appreciated a valve 43 can be located in or above the cartridge outlet 16 to stop the dripping of the residual fluid in the cartridge. The cartridge further comprises a plurality of protrusions 48 near the lower portion of chamber 11 to form collector 17 to lead the beverage from filter 15 to cartridge outlet 16. A freshness promoter 59 is placed in the chamber 11 to prolong the freshness of the flavor-containing materials 12. Barrier film 19 is attached to the cartridge outlet to seal the opening 18. The barrier film can be adapted to be removable by the user or breakable by the beverage fluid from filter 15.

A safety valve 76 is positioned at the extension tube 42 to close a channel 80 which communicates with channel 34 when the cartridge is not mounted to the mounting head or when the user does not mount the cartridge correctly. The safety valve comprises a valve chamber 61 in the extension tube, a seal member such as an elastomer ball 69, an activator 60 maintained in the valve chamber by a keeper 88 and a spring 68. When the cartridge 10 is being mounted, the inner wall 25 contacts a sloped end 84 of activator 60 and pushes the activator, thus the ball 69, towards the left side of the valve chamber against the spring to open the channel 80 to channel 34. When the cartridge is removed, the spring 68 pushes the ball 69 toward the right and closes the channel 80. The channel 34 is connected to a water chamber 72 for containing hot water to make beverages with cartridge 10. The water chamber comprises a heater 73 for heating water and an inlet 70 connected to a pressure source such as the in-house or in-building plumb system, compressed air or pressurized steam for forcing the water through the mounting head 33 and the cartridge 10. To allow fast preparation of a large quantity of beverage without being significantly limited by the heating rate of the heater 73, the water chamber may have a capacity to store a large quantity of water (e.g. 10 cups or 100 cups) at a predetermined or optimized temperature for making the beverage. Moreover, at faster speed the contact time between the hot water and the materials 12 is shorter, which may increase the beverage quality if the materials 12 is coffee grounds since shorter contact time reduces the amount of bitter chemicals in the extraction.

Figure 5B:
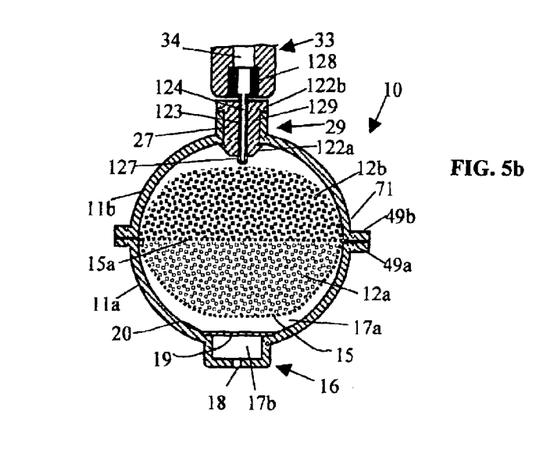
FIG. 5b is a sectional view of another modified version of the cartridge of FIG. 1 and a cartridge connector wherein the connection is a needle-septum connection.

FIG. 5b shows a modified cartridge 10 wherein the chamber 11 is formed by a lower chamber 11a and an upper chamber 11b, which are attached to each other at their flanges 49a and 49b, and the filter 15 is pushed into the lower chamber and sealed at its peripheral to flange 49a to receive a supply of flavor-containing materials 12a. An elastomer septum 129 is tightly fitted into the cylindrical opening 27 of the cartridge inlet 29 and secured therein by lower and upper enlarged parts 122a and 122b. It is appreciated that the elastomer septum can be secured to the opening 27 by other means such as heat-sealing or mechanical crimping. A normally closed opening may be formed in the elastomer septum to facilitate the insertion of the needle 123. Another filter 15a for the flavor-containing or particle materials 12b is sealed at its peripheral to the flange 49b of the upper chamber or the flange 49a of the lower chamber. The filter 15 is not completely conformed to the lower chamber 11a so that a space, i.e. Collect or 17, is formed between the filter 15 and the bottom of the lower chamber. The barrier film 19, which is breakable by the fluid from the filter 15, is attached to the bottom 20 of the lower chamber to seal the cartridge outlet, dividing divide the collector 17 into an upper collector 17a and a lower collector 17b. The septum 129 is soft enough to allow a needle 123 to penetrate. The needle has a base 128 connected to the mounting head 33, a channel 124 connected to channel 34 and a plurality of openings 127 at its lower end to distribute water over the flavor-containing or particle materials 12b.

Figure 5C:
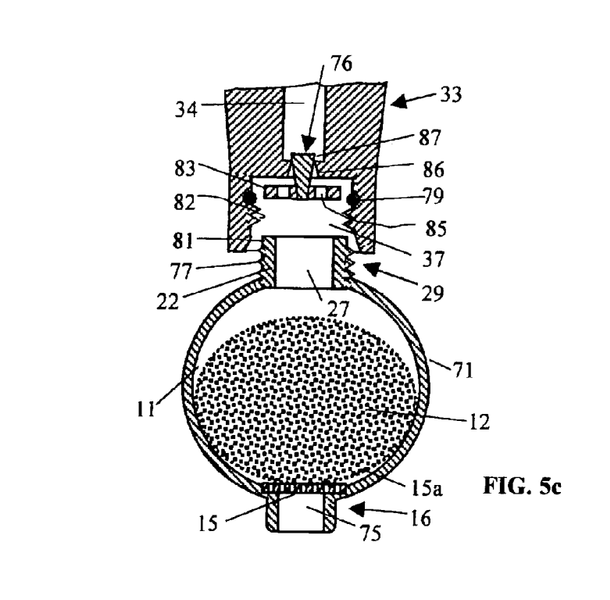
FIG. 5c is a sectional view of another modified version of the cartridge of FIG. 1 and a cartridge connector wherein the connection is made by thread.

FIG. 5c shows a modified cartridge 12 wherein the cartridge inlet 29 comprises a cylindrical body 22 having a cylindrical opening 27, a thread 77 on the outer surface of the cylindrical body for engaging with the thread 82 on the mounting head 33 and a seal section 81 for forming a hermetic seal with a gasket or o-ring 79 attached to the cylindrical chamber 37 of the mounting head. Safety valve 76 is located in the channel 34 for closing the channel when the cartridge is removed from the mounting head 33. The safety valve comprises a narrow section 86 of the channel, a valve body 87 having an enlarged upper end for closing the narrow section 86 and a lower end attached to a distributor 83 having a plurality of holes 85 for distributing water over the flavor-containing materials 12 in the chamber 11. When the cartridge is mounted, the cartridge inlet pushes the distributor 83 and the valve body 87 upwards, thus opening the channel 34 or the safety valve. The materials 12 is enclosed in filter 15a and the resulting pouch is elongated and inserted into the chamber 11 through the opening 27.

Figure 5D:
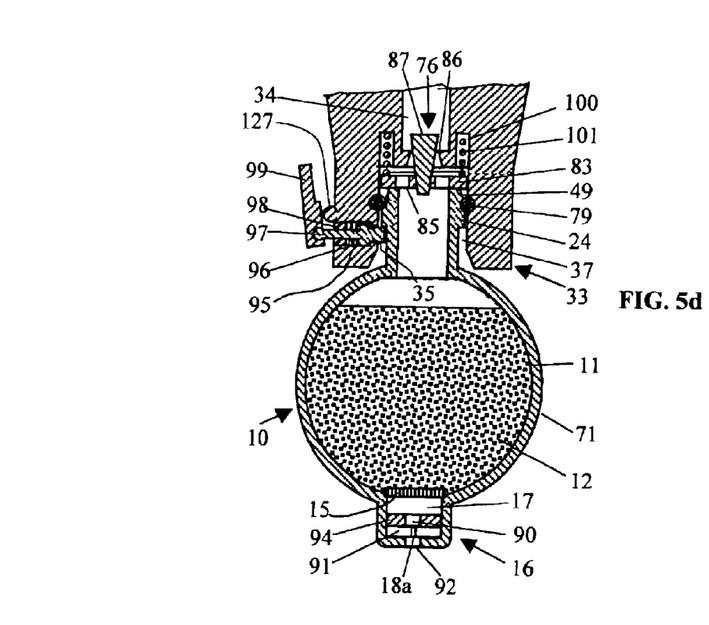
FIG. 5d is a sectional view of another modified version of the cartridge of FIG. 1 and a cartridge connector wherein the connection is made by simply pushing the cartridge into the cartridge connector.

FIG. 5d shows a modified cartridge 12 wherein the flange 24 of the cartridge inlet has a sloped surface 49 for facilitating the insertion into the chamber 37 of the mounting head 33 and forming a hermetic seal with the o-ring 49 mounted to the chamber 37. A latch or piston 35 in a latch chamber 95 formed at the peripheral wall of the chamber 37 is activated by a spring 96 to reach the underside of the flange 24 and locking the cartridge. The latch 35 and spring 96 are maintained in the latch chamber by a keeper 98. The latch 35 is extended outside the latch chamber by an extension 97. The extension 97 is connected to a handle 99, which is pivoted at a protrusion 127, so that the pressing of handle 99 causes the latch 35 to retract from the underside of the flange 24 and release the cartridge. A spring 101 in cylindrical slot 100 may be positioned above the distributor 83 downward after the cartridge is removed. The spring can also help ejecting the cartridge when the handle 99 is pressed. The cartridge has an expandable opening 18a formed on an elastic film or sheet 91. The expandable opening is adapted to expand in size when the pressure above increases, thus making it difficult to be clogged by solids. The elastic film or sheet 91 is secured above the opening 92 of the cartridge outlet 16 by a rigid member 94 having an opening 90. The elastic film or sheet 91 can also secured by heat-staking it to the peripheral wall around the opening 92. The expandable opening 18a can be in a closed position when the pressure across the film 91 is zero or sufficiently small so that the loss of aroma or freshness through the opening 18a is minimized or prevented. It is appreciated that other types of expandable openings such as an opening having on or within it a member movable by the pressure above the opening can also be used here.

Figure 6:
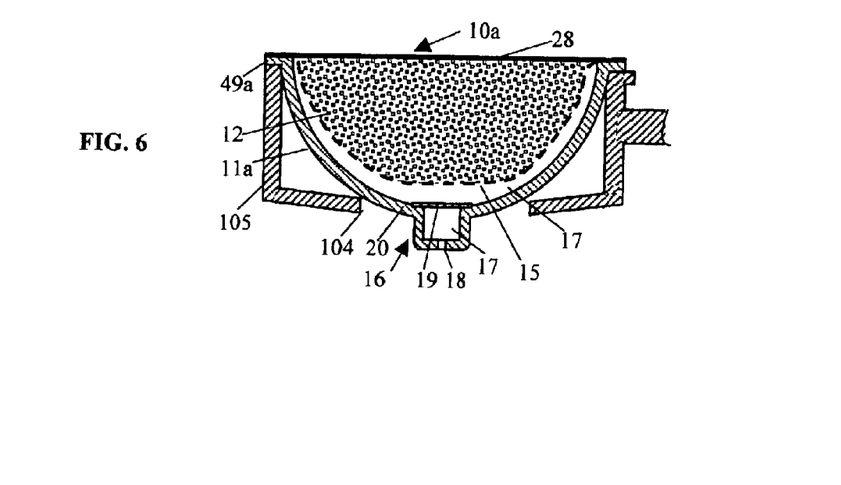
FIG. 6 is a sectional view of a cartridge supported by a holder in a manner that the beverage will not contact the holder.

FIG. 6 shows an alternative cartridge 10a wherein the cartridge comprises a chamber 11a having a flange 49a adapted to rest on a holder 105 for forming a hermetic seal between the flange 49a and the brew head of the brew head of existing espresso machines. Unlike the filter holders for existing espresso machines, holder 105 has a generally open bottom 104 for receiving the cartridge outlet 16 and allowing the beverage from the opening 18 of the cartridge outlet to discharge directly into a receptacle such as a cup or carafe 40, thus eliminating the need to clean the holder after brewing. The opening 18 can be an orifice or restrictive opening to produce a high-speed fluid jet to cause the formation of a foamy head or crema in the cup or carafe when it is received therein. As in FIG. 5b, the peripheral of filter 15A is attached to the flange and is partially conformed to the shape of the chamber 11a to receive flavor-containing materials 12 and the breakable barrier film 19 is attached to the cartridge outlet. The cover 28, which can be a water-permeable or a barrier film (or sheet), is attached to the flange 49a to keep the flavor-containing materials in the filter 15.

Figure 7:
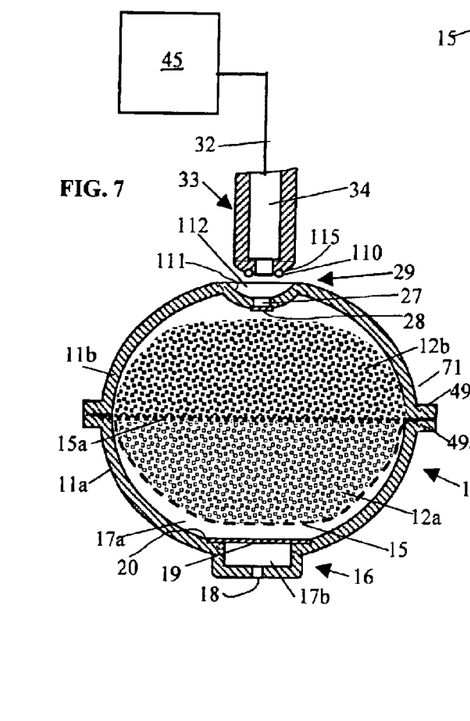
FIG. 7 is a sectional view of a cartridge and a cartridge connector wherein the connection is made by pressing the cartridge connector against the cartridge inlet.
Figure 7A:
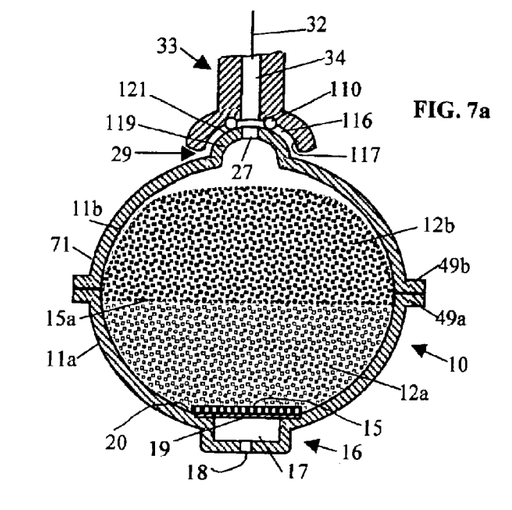
FIGS. 7a and 7b are the sectional views of two modified versions of the cartridge in FIG. 7.
Figure 7B:
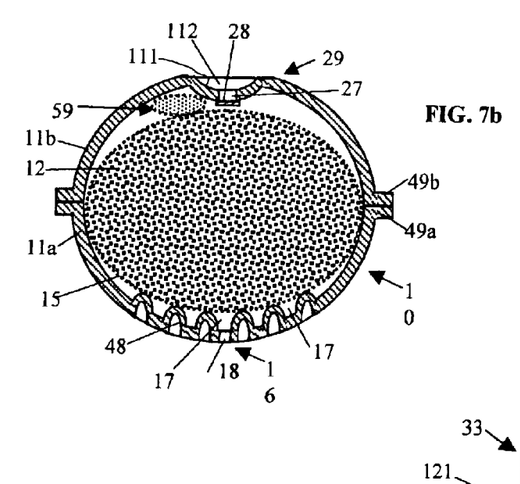

FIG. 7 shows an alternative cartridge 10 and mounting head 33. The cartridge is similar to the cartridge of FIG. 5b except the cartridge inlet 29 here comprises a recessed surface 111, a inlet chamber 112 and an opening 27 sealed by a breakable barrier film 28. The inlet chamber 112 is adapted to receive a tip 115 of the mounting head 33 so that the recessed surface 111 forms a hermetic seal with a gasket or o-ring 110 attached on the tip. The hermetic seal is maintained by pressing the tip 115 against the recessed surface 111, or vice versa, with a spring force, hydraulic force or other forces acted on the cartridge or tip 115. The inlet chamber 112 and tip 115 are preferably round or partially spherical to facilitate the connection of the cartridge and the mounting head. The upper and lower chambers are preferably produced from sheet material by mechanical forming, thermoforming or a combination of both for lower manufacturing cost. FIG. 7a shows a modified cartridge of FIG. 7 wherein a plurality of protrusions 48 are formed on the interior surface of lower chamber 11a for forming collector 17 to collect the fluid from the filter 15 and lead the fluid to the opening 18 of the cartridge outlet 16. FIG. 7b shows a modified cartridge 10 and mounting head 33 of FIG. 7 wherein the cartridge inlet comprises a protruded chamber 119, preferably round or partially spherical, a protruded surface 119 and opening 27, and the mounting head comprising recessed chamber 116 for receiving the protruded chamber 119 and gasket or o-ring 110 to form a hermetic seal with the protruded surface 119. A supply of a first flavor-containing materials 12a is placed directly on a separator or filter 15 and a supply of a first flavor-containing materials 12b is enclosed in filter 15a. In case that the materials 12a is milk granules or powder and materials 12b is coffee grounds for making milk-containing coffee drinks, the filter or separator 15 can have large openings to prevent the clogging of this filter by the gel or gel-like materials in the milk. It is found that the openings of the filter or separator 15 can be as large as about 3 mm without significantly impacting the brewing process or the quality of the beverage received in receptacle such as a cup or carafe 40. The barrier film helps to keep the milk granules or powder in the chamber 11a when the filter 15 has openings larger than the size of the milk granules or powder during the storage and handling of the cartridge 10.

Clearly, the modifications for the cartridges and mounting head can be combined into or removed from any of the exemplar embodiments of the invention. The scope of the invention is obviously not restricted to the embodiments described by way of examples and depicted in the drawings, there being numerous changes, modifications, additions, and applications thereof imaginable within the purview of the claims.

What is claimed is:

1. A low-cost disposable beverage cartridge capable of providing a beverage having a visually appealing crema layer on top of the beverage comprising:

a predetermined amount of flavor-containing materials which provides a beverage when interacted with pressurized water;

a containing chamber containing said flavor-containing materials, said containing chamber having a cartridge inlet for connecting to a mounting head to receive pressurized water from a pressurized water source and to allow the water to interact with said flavor-containing materials under pressure therein to produce a beverage;

a cartridge outlet opening for discharging the beverage produced in said containing chamber into a container; and a crema generator located between said cartridge outlet opening and said containing chamber for producing a visually appealing crema for the beverage, said crema generator comprising a filter for filtering the beverage produced in said containing chamber, a collection chamber located downstream of said filter for receiving the beverage from said filter and an orifice located on said collection chamber for the beverage received therein;

wherein the filtration openings of said filter are adapted to be of sufficiently small size to prevent the solid or un-dissolved flavor-containing materials from reaching and clogging said orifice; and wherein said orifice of said crema generator is adapted to be of sufficiently small size to generate a jet of beverage of sufficiently high speed to cause said visually appealing crema to form in the beverage before said beverage is discharged at said cartridge outlet opening.

2. A low-cost disposable beverage cartridge as defined in claim 1 further comprising a plate member on which said orifice is formed, wherein said collection chamber is formed between said filter and said plate member, and wherein at least one of said filter and said plate member is attached peripherally to said containing chamber.

3. A low-cost disposable beverage cartridge as defined in claim 2 wherein said plate member is adapted to deform under pressure.

4. A low-cost disposable beverage cartridge as defined in claim 1 further comprising a plate member on which said orifice is formed and a second filter, wherein said collection chamber is formed between said plate member and filter and wherein said containing chamber is formed between said filter and said second filter.

5. A low-cast disposable beverage cartridge as defined in claim 1 wherein said generator is adapted to produce said visually appealing crema when the pressure of said pressurized water source is from an in-house plumb system.

6. A low-cost disposable beverage cartridge as defined in claim 1 wherein said generator further comprises a solid surface adapted to receive or contact said jet of beverage from said orifice before the beverage is discharged from said cartridge outlet opening.

7. A low-cast disposable beverage cartridge as defined in claim 1 wherein said generator further comprises a outlet chamber adapted to maintain an amount of the beverage and to receive said jet of beverage during making the drink.

8. A low-cost disposable beverage cartridge as defined in claim 1 wherein said generator further comprises a second orifice adapted to generate a second jet of beverage for colliding with said jet of beverage.

9. A low-cost disposable beverage cartridge as defined in claim 1 wherein said cartridge outlet opening is sealed or closed prior to making beverage to prevent flavor loss of said flavor-containing materials.

10. A low-cost generally bulb-shaped beverage cartridge for brewing a beverage under pressure with pressurized hot water from a beverage machine having a mounting head comprising:

a predetermined amount of flavor-containing materials which provides a beverage when mixed in pressurized hot water from a beverage machine;

a generally water- and air-impermeable chamber containing said flavor-containing materials, said impermeable chamber being adapted to have a sufficient rigidity and strength to function both as a pressurized brewing chamber for said flavor-containing materials to interact with the pressurized hot water from the beverage machine and as a handle for mounting said beverage cartridge to the mounting head without substantial deformation;

a cartridge inlet having a rigid body and a through-opening for forming a water-tight seal to the mounting head and introducing the pressurized hot aqueous medium into said impermeable chamber, the cross-section area of said cartridge inlet being adapted to be substantially smaller than that of said impermeable chamber, thereby facilitating both the mounting and seal formation of said beverage cartridge to the mounting head;

a filter for the beverage brewed in said impermeable chamber from said flavor-containing materials;

a cartridge outlet comprising a collection chamber for receiving the beverage from said filter and a discharging opening for dispensing the drink into a container, the cross-section area of said cartridge outlet being adapted to be substantially smaller than that of said impermeable chamber, thereby facilitating the dispensing of the beverage into the container through its mouth;

a crema generator located between said impermeable chamber and said discharging opening for producing a visually appealing crema for the beverage, said generator having an orifice of sufficiently small size adapted to generate a high-speed jet of beverage that is capable of causing said visually appealing crema to form in the beverage before said beverage is discharged at said discharging opening, wherein said filter is adapted to have sufficiently small filtration openings to prevent said orifice from being clogged by said flavor-containing materials; and wherein said impermeable chamber, said cartridge inlet and said cartridge outlet are formed from a single shot or sheet of plastic material by one of blow-molding and thermal forming processes as one piece without any seal or seam between said impermeable chamber, cartridge inlet and cartridge outlet in order to make said bulb-shaped beverage cartridge a seamless cartridge, thereby significantly reducing the cost of said beverage cartridge by eliminating the normal manufacturing process of sealing or connecting said impermeable chamber, cartridge inlet and cartridge outlet together, and thereby eliminating the safety risk associated with very hot water under pressure that may forcefully eject out of a defective seam of a cartridge and cause hot-water burning to the user when brewing a beverage.

11. A low-cost bulb-shaped beverage cartridge as defined in claim 10 further comprising a bottom opening for said impermeable chamber located at the entrance of said collection chamber of cartridge outlet, wherein said through-opening, filter and bottom opening are so dimensioned that said filter can be connected to the interior of said impermeable chamber to cover said bottom opening without damaging said cartridge inlet.

12. A low-cost bulb-shaped beverage cartridge as defined in claim 10 wherein said impermeable chamber is adapted to have a generally spherical or oval shape to facilitate the formation of said cartridge inlet and cartridge outlet, both of which have a cross-section substantially smaller than said impermeable chamber, during said one of blow-molding and thermal forming processes.

13. A low-cost bulb-shaped beverage cartridge as defined in claim 10 further comprising at least one of a flange and a thread on the outside of said cartridge inlet for engaging with the mounting head to prevent said beverage cartridge from being dislodged by the pressure therein, wherein said at least one of a flange and a thread, said cartridge inlet, generally water- and air-impermeable chamber and cartridge outlet are formed from said single shot or sheet of plastic material by said one of blow-molding and thermal forming processes as one piece without any seam between them.

14. A low-cost bulb-shaped beverage cartridge as defined in claim 13 wherein said cartridge inlet adopts a generally cylindrical shape to enable said one of a flange and a thread to move into a cylindrical chamber of the mounting head having an engagement member on the inner surface of the cylindrical chamber as one turns said disposable beverage cartridge, wherein said one of a flange and a thread and said through-opening of said cartridge inlet are so dimensioned and positioned that said through-opening of said cartridge inlet receives fittingly an extension tube on the mounting head before said one of a flange and a thread engages to the engagement member of the cylindrical chamber, thereby enabling the extension tube to guide said engagement to ensure flawless mounting of said cartridge inlet into the cylindrical chamber of the mounting head.

15. A low-cost bulb-shaped beverage cartridge as defined in claim 13 further comprising one of a recess and a protrusion on the lower side of said one of a flange and a thread, wherein said cartridge inlet adopts a generally cylindrical shape to enable said one of a flange and a thread to move into a cylindrical chamber of the mounting head having an engagement member on the inner surface of the cylindrical chamber as one turns said disposable beverage cartridge, and wherein said one of a recess and protrusion being adapted to fit to one of a matching protrusion and recess on the engagement member of the mounting head to prevent the beverage cartridge from being turned to be removed from the mounting head when there is pressure in the beverage cartridge, thereby preventing any potential risk of burning by hot water when removing said beverage cartridge.

16. A low-cost bulb-shaped beverage cartridge as defined in claim 10 further comprising a breakable barrier film for sealing said cartridge inlet to prevent flavor loss of said flavor-containing materials, said breakable barrier film being attached a predetermined distance below the top end of said cartridge inlet to the inner surface of said through-opening.

17. A low-cost bulb-shaped beverage cartridge as defined in claim 10 wherein said cartridge inlet is adapted to connect to a mounting head that is hand-held and connected to the beverage machine by a flexible tube, and wherein said flavor-containing materials comprises roasted coffee grounds, thereby allowing a user to dispense a coffee drink to a cup substantially away from the beverage machine.

18. A low-cost bulb-shaped beverage cartridge as defined in claim 10 further comprising a plug of porous materials between said flavor-containing materials in said generally oval or spherical chamber and said cartridge inlet, wherein said flavor-containing materials comprises roasted coffee grounds.

19. A low-cost disposable beverage cartridge capable of providing a beverage having a visually appealing crema layer on top of the beverage comprising:
   a predetermined amount of flavor-containing materials which provides a beverage when interacted with pressurized water;
   a containing chamber containing said flavor-containing materials, said containing chamber having a cartridge inlet for connecting to a mounting head to receive pressurized water from a pressurized water source and to allow the water to interact with said flavor-containing materials under pressure therein to produce a beverage;
   a crema generator connected to said containing chamber for producing a visually appealing crema for the beverage, said crema generator comprising a filter for filtering the beverage produced in said containing chamber, a collection chamber located downstream of said filter for receiving the beverage from said filter and an orifice located on said collection chamber for the beverage received therein;
   a cartridge outlet opening for discharging the beverage produced in said containing chamber into a container;
   wherein the filtration openings of said filter are adapted to be of sufficiently small size to prevent the solid or un-dissolved flavor-containing materials from reaching and clogging said orifice; and
   wherein said orifice of said crema generator is adapted to be of sufficiently small size to generate a jet of beverage of sufficiently high speed to cause said visually appealing crema to form in the beverage.

20. A low-cost disposable beverage cartridge as defined in claim 19 wherein said filtration openings of said filter have a size of approximately 0.01 to 0.2 millimeters.

21. A low-cost disposable beverage cartridge as defined in claim 19 further comprising a plate member on which said orifice is formed, wherein said collection chamber is formed between said filter and said plate member, and wherein at least one of said filter and said plate member is attached peripherally to said containing chamber.

22. A low-cost disposable beverage cartridge as defined in claim 19 further comprising a plate member on which said orifice is formed and a second filter, wherein said collection chamber is formed between said plate member and filter and wherein said containing chamber is formed between said filter and said second filter.

23. A low-cost disposable beverage cartridge as defined in claim 19 wherein said orifice is adapted to direct said jet of beverage into a chamber adapted to maintain an amount of beverage therein during the use of said beverage cartridge.

* * * * *